US012738886B2

(12) United States Patent
Szwarc et al.

(10) Patent No.: US 12,738,886 B2
(45) Date of Patent: Sep. 15, 2026

(54) PHOTOVOLTAIC FENCE SYSTEM AND ASSOCIATED METHODS

(71) Applicants: Rafal Szwarc, Northfield, IL (US); Robert Szwarc, Northfield, IL (US)

(72) Inventors: Rafal Szwarc, Northfield, IL (US); Robert Szwarc, Northfield, IL (US)

( * ) Notice: Subject to any disclaimer, the term of this patent is extended or adjusted under 35 U.S.C. 154(b) by 0 days.

(21) Appl. No.: 19/244,480

(22) Filed: Jun. 20, 2025

(65) Prior Publication Data

US 2026/0005645 A1 Jan. 1, 2026

Related U.S. Application Data

(60) Provisional application No. 63/665,581, filed on Jun. 28, 2024.

(51) Int. Cl.

*H02S 30/10* (2014.01)
*H02S 20/30* (2014.01)
*H02S 40/32* (2014.01)
*H02S 40/36* (2014.01)
*H02S 40/38* (2014.01)
*H02S 40/44* (2014.01)

(52) U.S. Cl.

CPC .............. *H02S 30/10* (2014.12); *H02S 20/30* (2014.12); *H02S 40/32* (2014.12); *H02S 40/36* (2014.12); *H02S 40/38* (2014.12); *H02S 40/44* (2014.12)

(58) Field of Classification Search

None

See application file for complete search history.

(56) References Cited

U.S. PATENT DOCUMENTS

| | | | | |
|---|---|---|---|---|
| 5,968,287 | A | 10/1999 | Nath | |
| 8,418,415 | B2 | 4/2013 | Shiao | |
| 8,733,038 | B2 | 5/2014 | Kalkanoglu | |
| 9,312,418 | B2 | 4/2016 | Beckerman | |
| 10,024,578 | B1 * | 7/2018 | Rutkai | E04H 4/129 |
| 10,851,560 | B2 | 12/2020 | McCarthy | |
| 11,867,431 | B2 | 1/2024 | Moslehi | |
| 2004/0140462 | A1 * | 7/2004 | Rowley | F24S 30/422 256/27 |
| 2010/0126087 | A1 | 5/2010 | Brescia | |

(Continued)

FOREIGN PATENT DOCUMENTS

WO WO-2022168355 A1 * 8/2022 ............. H02S 20/10

OTHER PUBLICATIONS

English machine translation of Yoshihiro (WO-2022168355-A1) provided by the EPO website, All Pages, 2025. (Year: 2025).*

*Primary Examiner* — Daniel P Malley, Jr.

(74) *Attorney, Agent, or Firm* — Bullock Law; Stephen Bullock

(57) ABSTRACT

A photovoltaic fence system including a plurality of removably connected photovoltaic fence panels, each panel having a first column and a second column. A panel frame extends from the first column to the second column with a plurality of photovoltaic blades positioned within the frame. An electrical conduit within the panel frame is structured to link electrical componentry from one removably connected photovoltaic fence panel to another. The first column and second column are structured to removably connect one photovoltaic fence panel to another. The photovoltaic fence system as a whole is structured to capture solar energy.

19 Claims, 8 Drawing Sheets

(56) References Cited

U.S. PATENT DOCUMENTS

| | | | | |
|---|---|---|---|---|
| 2010/0288264 | A1* | 11/2010 | Zhang | F24S 80/54<br>126/701 |
| 2011/0303262 | A1* | 12/2011 | Wolter | H10F 19/90<br>136/251 |
| 2018/0175661 | A1* | 6/2018 | Tuerk | H02S 10/12 |
| 2023/0283224 | A1 | 9/2023 | Rodrigues | |
| 2024/0088822 | A1* | 3/2024 | Hildebrandt | H02S 20/10 |

* cited by examiner

PHOTOVOLTAIC FENCE SYSTEM AND ASSOCIATED METHODS

FIELD OF THE INVENTION

The present invention relates to outdoor solar panels. In particular, the present invention relates to louvered solar paneled fences.

BACKGROUND

Currently there is no reliable means to capture solar energy around a structure or in open land. Traditional solar panels have been placed on the roof of a structure and sometimes on the structure walls. However, neither of these methods takes advantage of the solar energy capturing potential of the area surrounding a structure or in open land. Furthermore, when flat panels are placed on a structure, the angle of the panels are reliant on the angle of the structure on which they are placed.

Traditional solar panels have not provided the combination of privacy and the securement of land boundaries with the ability to capture solar energy. Additionally, because most of the surface area of a fence is vertically oriented, there exists an opportunity to optimize collection of solar energy while still conserving land, so long as the fence is structured properly.

U.S. Patent Application No. 2010/0126087 and U.S. Pat. No. 5,968,287 describe panels to be placed on structures. The inventions in these publications rely on the structure itself for support and placement angle. U.S. Pat. No. 11,867,431 describes a photovoltaic window blind, but this apparatus is unable to stand alone in open land and again is reliant on a building for support and placement.

There exists a need in the art for an apparatus that takes advantage of open land space for solar energy capture. The apparatus should provide privacy and boundary security, but not waste open land space. Furthermore, it should not rely on another structure for its orientation and it should be modular making it easy to assemble and disassemble. Therefore, there exists a need in the art for a louvered solar paneled fence system and associated methods as shown and described herein.

SUMMARY OF THE INVENTION

Embodiments of the present invention are related to a modular photovoltaic fence system including a plurality of removably connected photovoltaic fence panels, each panel having a first column and a second column, a panel frame extending from the first column to the second column, a plurality of louvered photovoltaic blades within the panel frame extending from the first column to the second column, an electrical conduit within the panel frame structured to link electrical componentry from one removably connected photovoltaic fence panel to another removably connected photovoltaic fence panel, a rack assembly on the first column and second column structured to removably link one photovoltaic fence panel to another photovoltaic fence panel, and a control box removably connected to at least one photovoltaic fence panel wherein the photovoltaic fence system is configured to capture solar energy.

In this embodiment, the plurality of photovoltaic blades may be angled and, in some embodiments angled based on the geolocation of the photovoltaic fence system. The photovoltaic fence panels may be removably connected via at least one of strut style poles, lock nuts, clamps and bushings.

At least one of the first column and second column may be a housing including at least one of an inverter, a battery bank, and a control panel. Likewise, at least one of the first column and second column may be a housing including at least one of a heat pump, circulation pump and control panel. In some embodiments, the photovoltaic fence system may have a radiator panel structured to heat an adjacent electrically connected structure. Additionally, each removably connected photovoltaic fence panel may be adjustably angled with respect to another removably connected photovoltaic fence panel.

In some embodiments the plurality of photovoltaic blades may be positioned in at least one of a vertical and horizontal orientation longitudinally. Furthermore, each photovoltaic fence panel may include an electrical outlet to deliver converted solar energy to power external devices. In some embodiments, the photovoltaic fence system may be electrically connected to an adjacent structure.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as “above” “below” “upper” “lower” and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as “generally” “substantially” “mostly” and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1A:
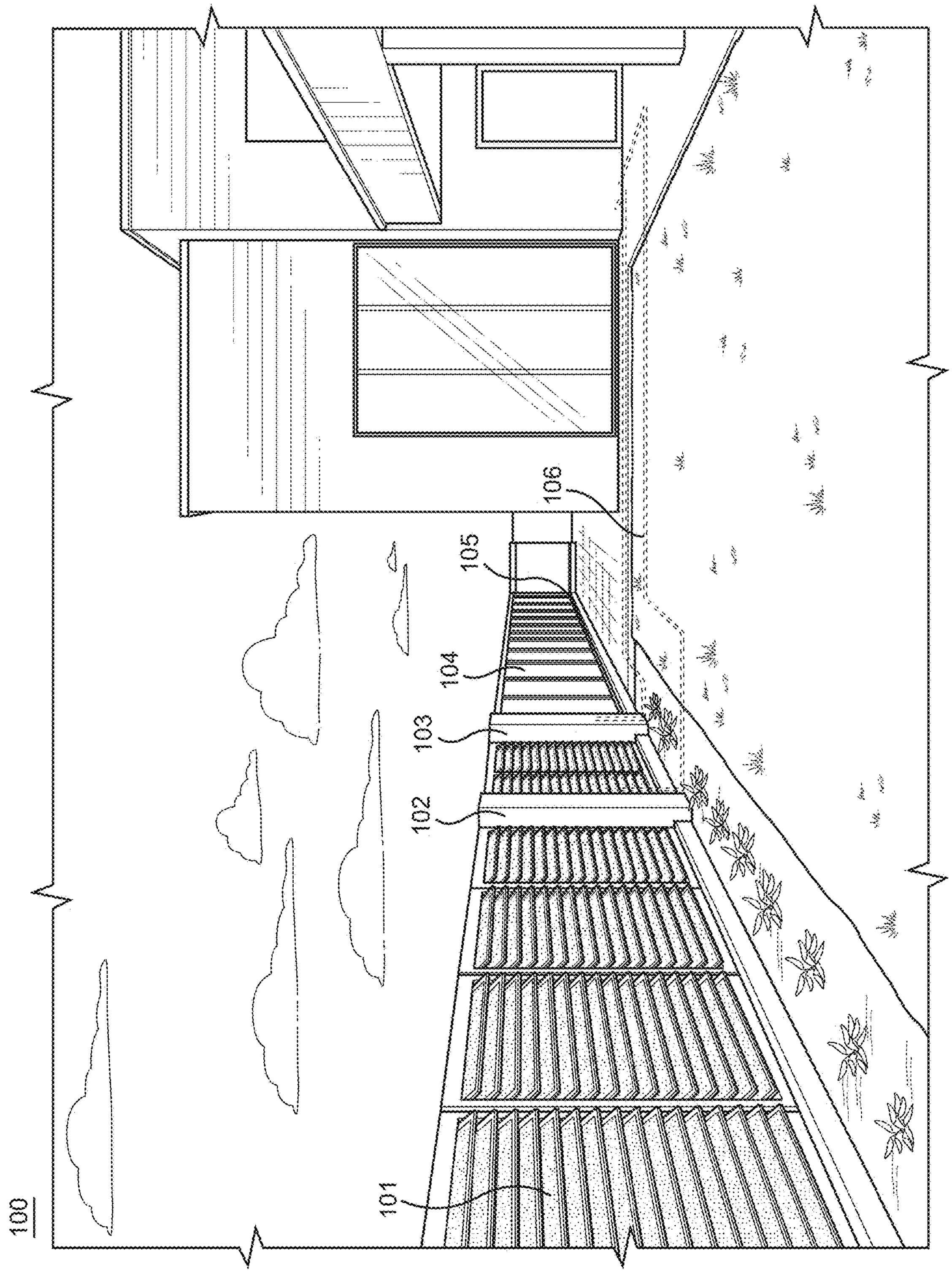
FIG. 1A is an environmental view of the photovoltaic fence system according to an embodiment of the invention.

Referring now to FIG. 1A, the photovoltaic fence system 100, hereinafter referred to as the fence 100 or fence system 100, will be described more fully. The fence system 100 may include a plurality of photovoltaic louvered panels 101 specifically angled and optimized to capture sunlight. In this embodiment the photovoltaic louvered panels 101 are horizontal. However, one skilled in the art will appreciate that they may also be vertical, angled, or any other orientation optimized to capture light. In some segments of the fence 100, the photovoltaic louvered panels 101 may connect two or more fence columns 102. In the depicted embodiment, there is a first column 102 and a second column 103. The fence columns 102, 103 may themselves serve as housings for different componentry of the fence 100. By way of non-limiting example, one fence column 102 may include an inverter, a battery bank, and a control panel. Another fence column 103 may include a heat pump with circulation pump control panel.

In some embodiments, the fence system 100 may include a radiator panel 104 with vertical tube system as a heat inlet. This may collect heat for an adjacent home that may be delivered via electric wires and tubing connecting the fence system 100 with the home. Furthermore, the fence system may include a liquid medium supply 106.

Figure 1B:
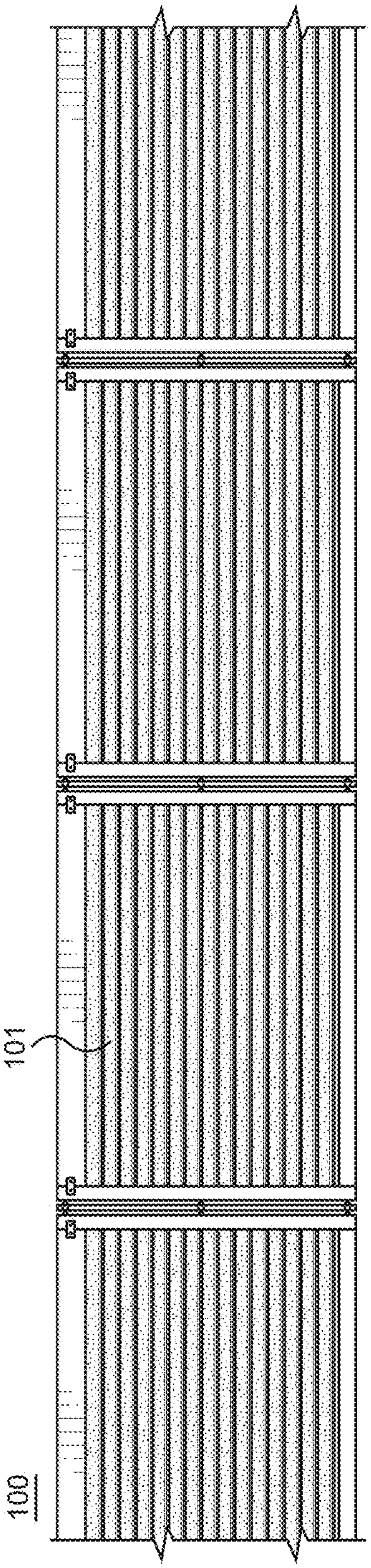
FIG. 1B is a front segmented view of the photovoltaic fence system Illustrated in FIG. 1A.
Figure 1C:
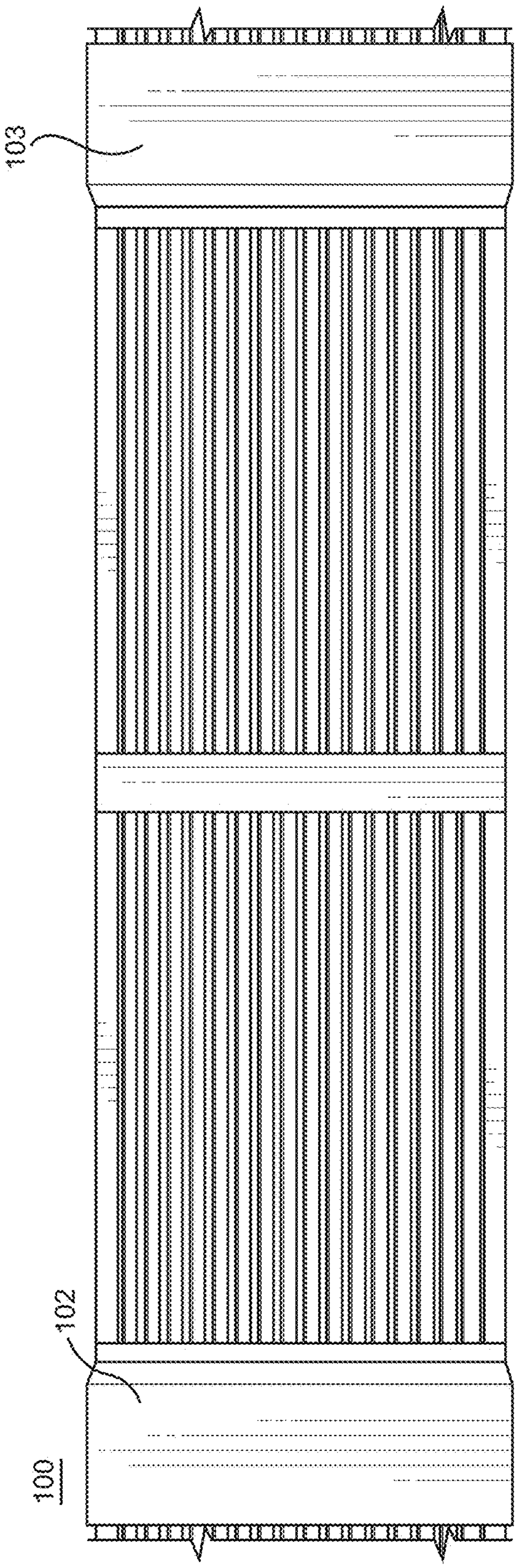
FIG. 1C is a front segmented view of the photovoltaic fence system illustrated in FIG. 1A.

FIGS. 1B and 1C take a closer look at portions of the fence system 100 emphasizing the photovoltaic horizontal panels 101 that make up the fence 100 itself as well as the fence columns 102, 103. In particular, shown is the first column 102 containing the inverters, battery bank and control panel as well the second column 103 containing a heat pump with circulation pump control panel 103.

Figure 2:
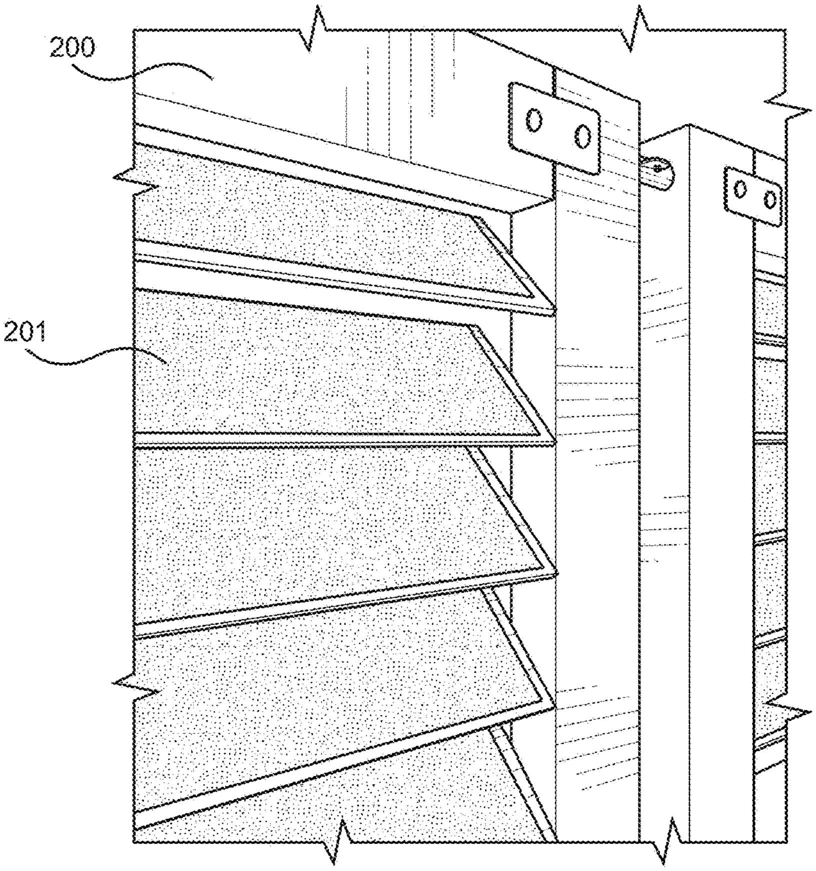
FIG. 2 is a perspective segmented view of the photovoltaic fence system illustrated in FIG. 1A.

FIG. 2 shows a closer look at the angled photovoltaic blades 201 along with the panel frame 200. The angled photovoltaic blades 201 may be positioned within the panel frame 200 extending from one fence column 102 to another fence column 103, optimally angled based on the geolocation of the fence system 100. By way of non-limiting example, the photovoltaic blades 201 may be more or less angled depending on whether the fence system 100 is located in Maine or New Mexico. Furthermore, in some embodiments the panel frame 200 may also serve as a housing 103 for electric componentry, which may run through an upper or lower conduit of the fence system 100.

Figure 3:
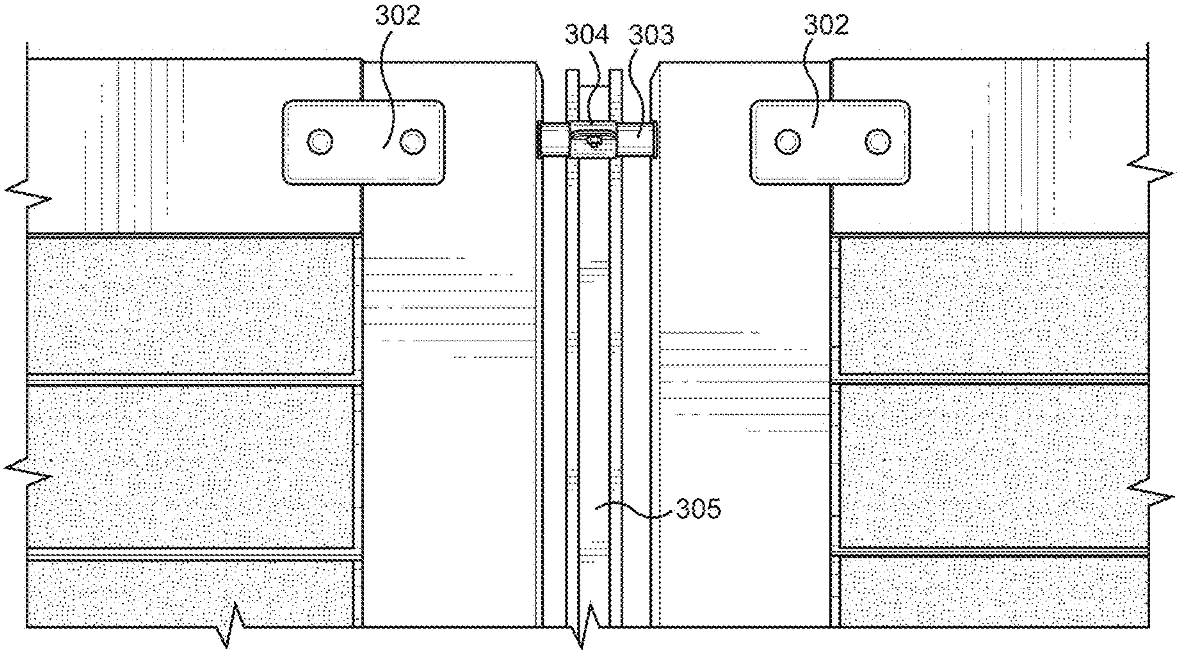
FIG. 3 is a front segmented view of the photovoltaic fence system illustrated in FIG. 1A illustrating linked units and mounting methods.

FIG. 3 illustrates a rigid conduit 303 that may link the electrical componentry of two adjacent panels 101 that are removably connected. Additionally, galvanized strut style poles 305 may be used as a means to rack the panels 101 and lock nuts and bushings may be used to carry the panel 101. Additionally, clamps 304 may allow for mounting and adjusting the level of the panel 101.

Figure 4:
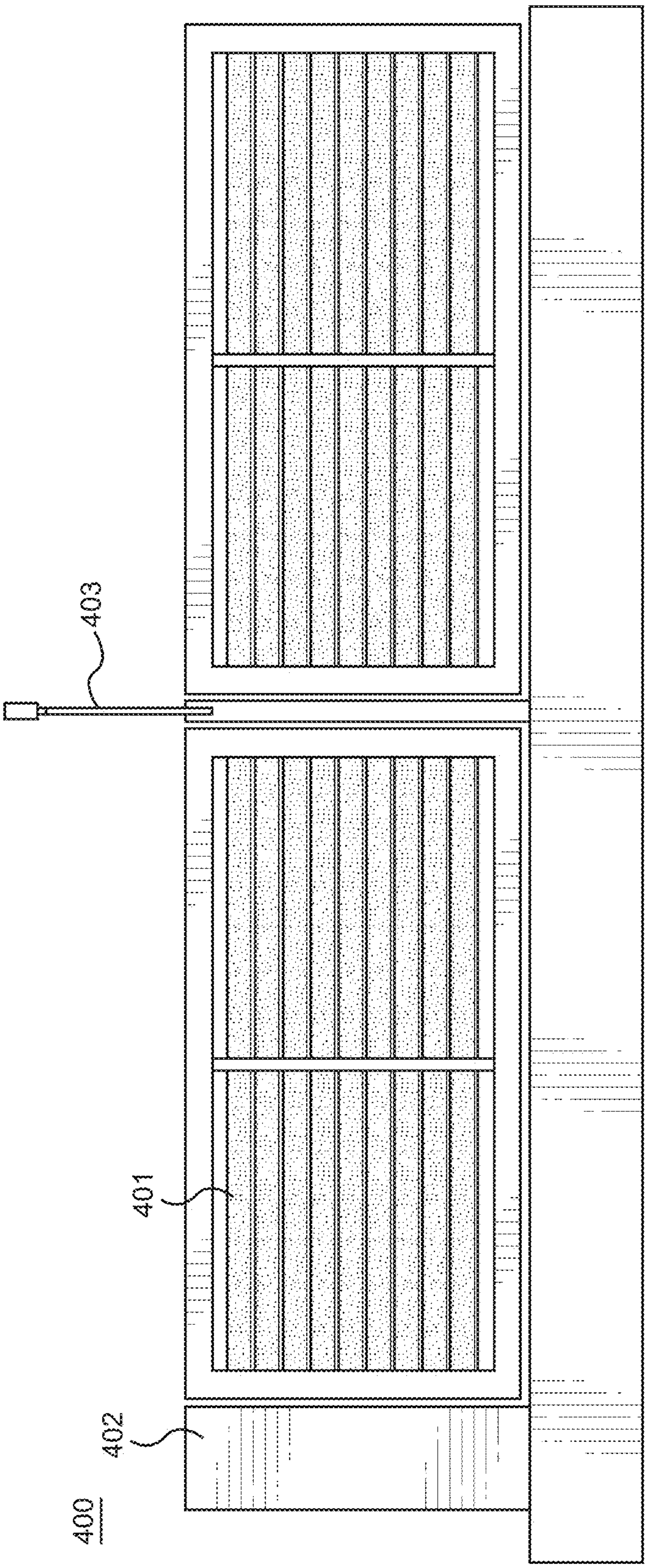
FIG. 4 is a front view of the photovoltaic fence system according to another embodiment of the invention.

FIG. 4 illustrates another embodiment of the invention whereby the horizontal photovoltaic paneling 401 is incorporated into a photovoltaic road barricade 400. This may be a portable version of the fence system 100 whereby a single panel 400 may be placed alongside or in the pathway of a road. It may include a column 103 comprising a battery and inverter bank 402 and a road lighting pole 403.

Figure 5:
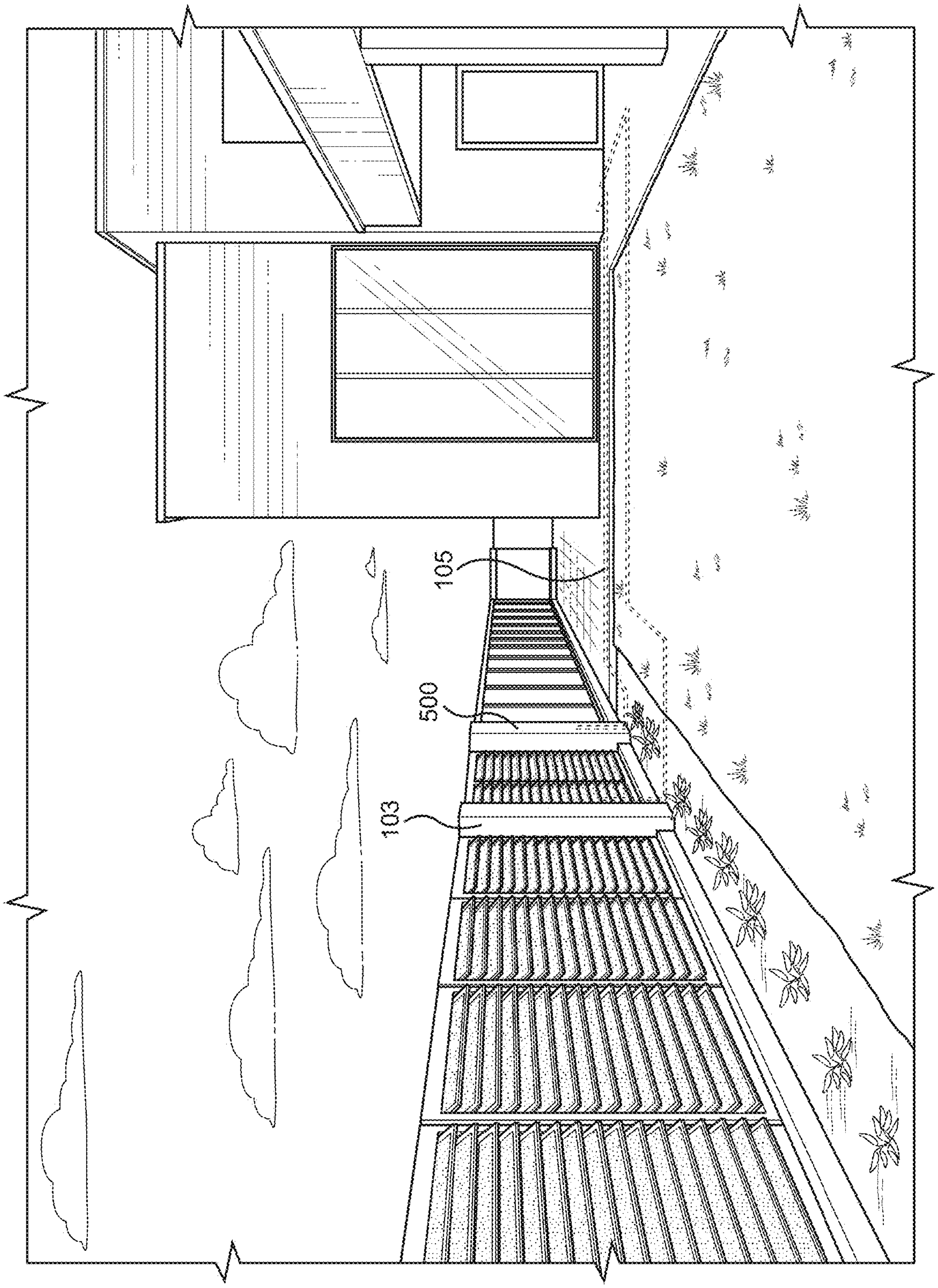
FIG. 5 is an environmental view of the photovoltaic fence system according to an embodiment of the invention.
Figure 6A:
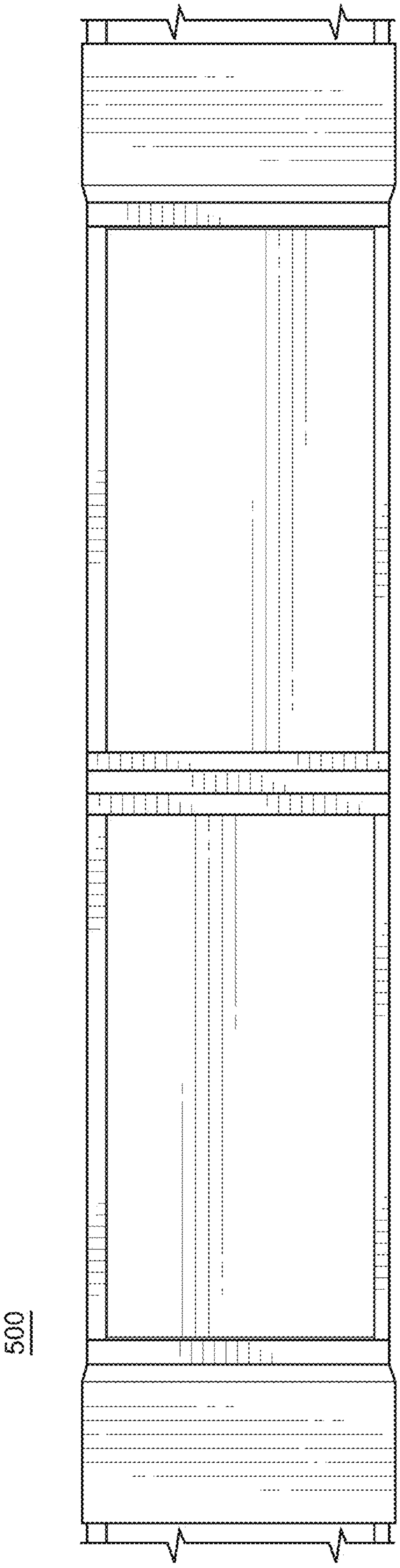
FIG. 6A is a front view of the photovoltaic fence system according to an embodiment of the invention.

FIGS. 5 and 6A illustrate another component of the invention illustrated in FIG. 1 including a heat collecting panel 500. This may include a heat pump with circulation pump control panel 103 as well as electrical wiring 105 connecting the fence system with an adjacent home. FIG. 6A shows the exterior of the heat collecting panel 500 whereby the panel exterior may be smooth.

Figure 6B:
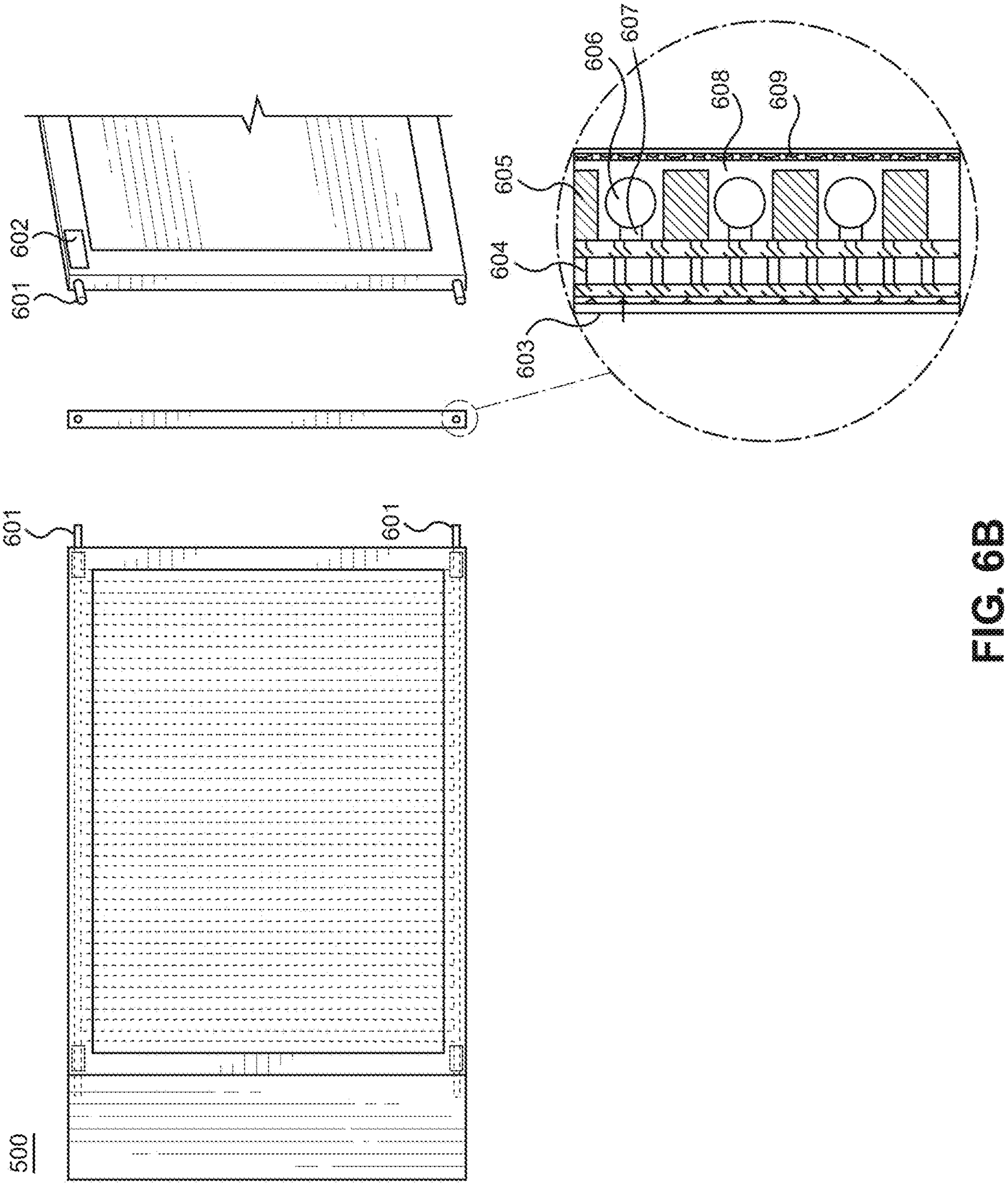
FIG. 6B is an exploded segmented view of componentry of the photovoltaic fence system according to an embodiment of the invention.

FIG. 6B is an exploded segmented view of the heat collecting panel 500 according to an embodiment of the invention. As shown, there may be a rigid threaded pipe 601 that may serve as an interlocking device between two panels. In some embodiments, it may carry a ½ inch pipe inside. There may also be an access panel 602 with a plumbing connection on each corner of the panel frame 200. It may include an insulation layer 604 ranging between ½ to ¾ inches thick covered with absorbent coating. It may also include anti-convection blades 605 placed every 3 to 12 inches or so. Copper tubing 606 may be used as a conduit. Additionally, there may be holding brackets 607, CO2 insulator gas 608 and a front acrylic panel 609 and a back sheet 603.

Figure 7:
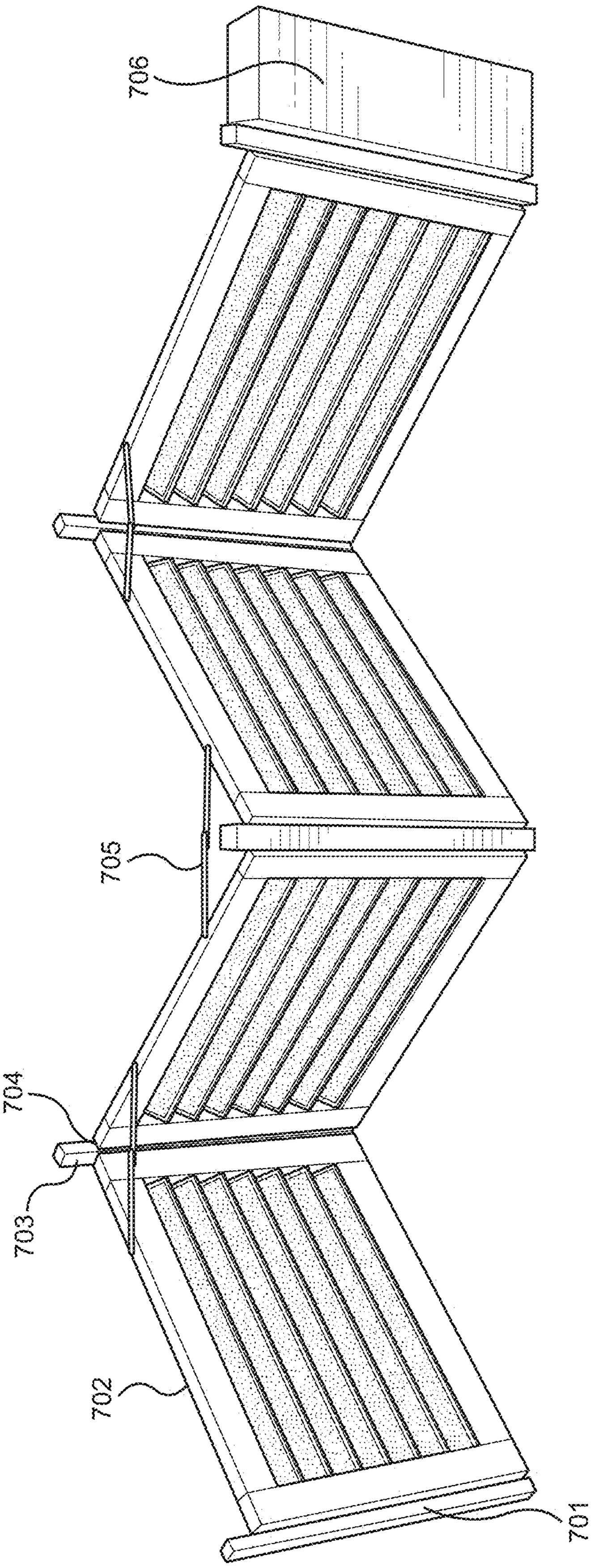
FIG. 7 is a top perspective view of an embodiment of the photovoltaic fence system.

FIG. 7 illustrates another embodiment of the invention whereby the fence system 100 may include a plurality of foldable independent vertical solar panels 700. Each removably connected photovoltaic fence panel 700 may be adjustably angled 705 with respect to another removably connected photovoltaic fence panel 700. Additionally, and by way of non-limiting example, these may be dimensioned as 48 inches by 36 inches. They may include double side open hinges 701 and may spike to the ground 702 or bolt with a flat surface T-option. There may be a connecting wire 703 and a lock bracket 704 with a butterfly screw to create a zigzag self-standing structure. A control box 706 with inverter, battery bank, and GFCI outlet may be included on the panels as well. The electrical outlet may deliver converted solar energy to power external devices.

One skilled in the art will appreciate that the photovoltaic fence system (referred to by number 100 in FIG. 1) as illustrated in FIGS. 1A, 1B, 1C, 2, 3, 4, 5, 6A, 6B and 7 is modular. This means that the photovoltaic fence system 100 includes a plurality of removably connected photovoltaic fence panels 101, each fence panel 101 being a module of the modular system 100. Each photovoltaic fence panel 101 can thus be connected and disconnected with respect to the other modules.

That which is claimed is:

1. A photovoltaic fence system comprising:

a plurality of removably connected photovoltaic fence panels, each photovoltaic fence panel comprising:
- a first column and a second column,
- a panel frame extending from the first column to the second column,
- a plurality of photovoltaic blades positioned within the panel frame extending from the first column to the second column,
- an electrical conduit within the panel frame configured to link electrical componentry from one removably connected photovoltaic fence panel to another removably connected photovoltaic fence panel, wherein at least one of the first column and second column is a control box comprising a battery bank;
- wherein the photovoltaic fence panels are removably connected modular components of the photovoltaic fence system;
- wherein the photovoltaic fence system is configured to capture solar energy;
- wherein each individual photovoltaic fence panel is pivotally connected at its respective first column or second column;

wherein the photovoltaic fence system is removably electrically connected to an adjacent building.

2. The photovoltaic fence system of claim 1 wherein the plurality of photovoltaic blades is angled.

3. The photovoltaic fence system of claim 1 wherein the plurality of photovoltaic blades is angled based on the geolocation of the photovoltaic fence system.

4. The photovoltaic fence system of claim 1 wherein the control box comprises an inverter.

5. The photovoltaic fence system of claim 1 wherein at least one of the first column and second column comprises at least one of a heat pump, circulation pump and control panel.

6. The photovoltaic fence system of claim 1 further including a radiator panel configured to heat an adjacent electrically connected structure.

7. The photovoltaic fence system of claim 1 wherein each removably connected photovoltaic fence panel may be adjustably angled with respect to another removably connected photovoltaic fence panel.

8. A modular photovoltaic fence system comprising:
- a plurality of removably connected photovoltaic fence panels, each photovoltaic fence panel comprising:
  - a first column and a second column,
  - a panel frame extending from the first column to the second column,
  - a plurality of photovoltaic blades within the panel frame spanning from the first column to the second column,
  - an electrical conduit within the panel frame configured to link electrical componentry from one removably connected photovoltaic fence panel to another removably connected photovoltaic fence panel,
  - a rack assembly on the first column and second column configured to removably link one photovoltaic fence panel to another photovoltaic fence panel within the photovoltaic fence system;
- wherein each individual photovoltaic fence panel is pivotally connected at its respective first column or second column;
- wherein at least one of the first column and second column is a control box comprising a battery bank; wherein the photovoltaic fence panels are removably connected modular components of the photovoltaic fence system;
  - wherein the photovoltaic fence system is configured to capture solar energy; and
  - wherein the photovoltaic fence system is removably electrically connected to an adjacent building.

9. The photovoltaic fence system of claim 8 wherein the plurality of photovoltaic blades are oriented in a vertical position longitudinally within the panel frame.

10. The photovoltaic fence system of claim 8 wherein the plurality of photovoltaic blades are oriented in a horizontal position longitudinally within the panel frame.

11. The photovoltaic fence system of claim 8 further including an inverter.

12. The photovoltaic fence system of claim 8 wherein each photovoltaic fence panel includes an electrical outlet configured to deliver converted solar energy to power external devices.

13. The photovoltaic fence system of claim 8 wherein the plurality of photovoltaic blades is angled.

14. The photovoltaic fence system of claim 8 wherein the plurality of photovoltaic blades is angled based on the geolocation of the photovoltaic fence system.

15. The photovoltaic fence system of claim 8 wherein the photovoltaic fence system is electrically connected to an adjacent structure.

16. The photovoltaic fence system of claim 8 wherein the rack assembly is comprised of strut style poles, lock nuts, clamps and bushings.

17. A modular photovoltaic fence system comprising:
- a plurality of removably connected photovoltaic fence panels, each photovoltaic fence panel comprising:
  - a first column and a second column,
  - a panel frame extending from the first column to the second column,
  - a plurality of louvered photovoltaic blades within the panel frame extending from the first column to the second column,
  - an electrical conduit within the panel frame configured to link electrical componentry from one removably connected photovoltaic fence panel to another removably connected photovoltaic fence panel,
  - a rack assembly on the first column and second column configured to removably link one photovoltaic fence panel to another photovoltaic fence panel within the photovoltaic fence system,
  - a control box removably connected to at least one photovoltaic fence panel, wherein each individual photovoltaic fence panel is pivotally connected at its respective first column or second column;
  - wherein at least one of the first column and second column is a control box comprising a battery bank;
  - wherein the photovoltaic fence panels are removably connected modular components of the photovoltaic fence system;
  - wherein the photovoltaic fence system is configured to capture solar energy; and
- wherein the photovoltaic fence system is removably electrically connected to an adjacent building.

18. The photovoltaic fence system of claim 17 wherein the louvered photovoltaic blades are angled based on the geolocation of the fence.

19. The photovoltaic fence system of claim 17 wherein the louvered photovoltaic blades are positioned in at least one of a vertical and horizontal orientation longitudinally.

* * * * *